United States Patent Office

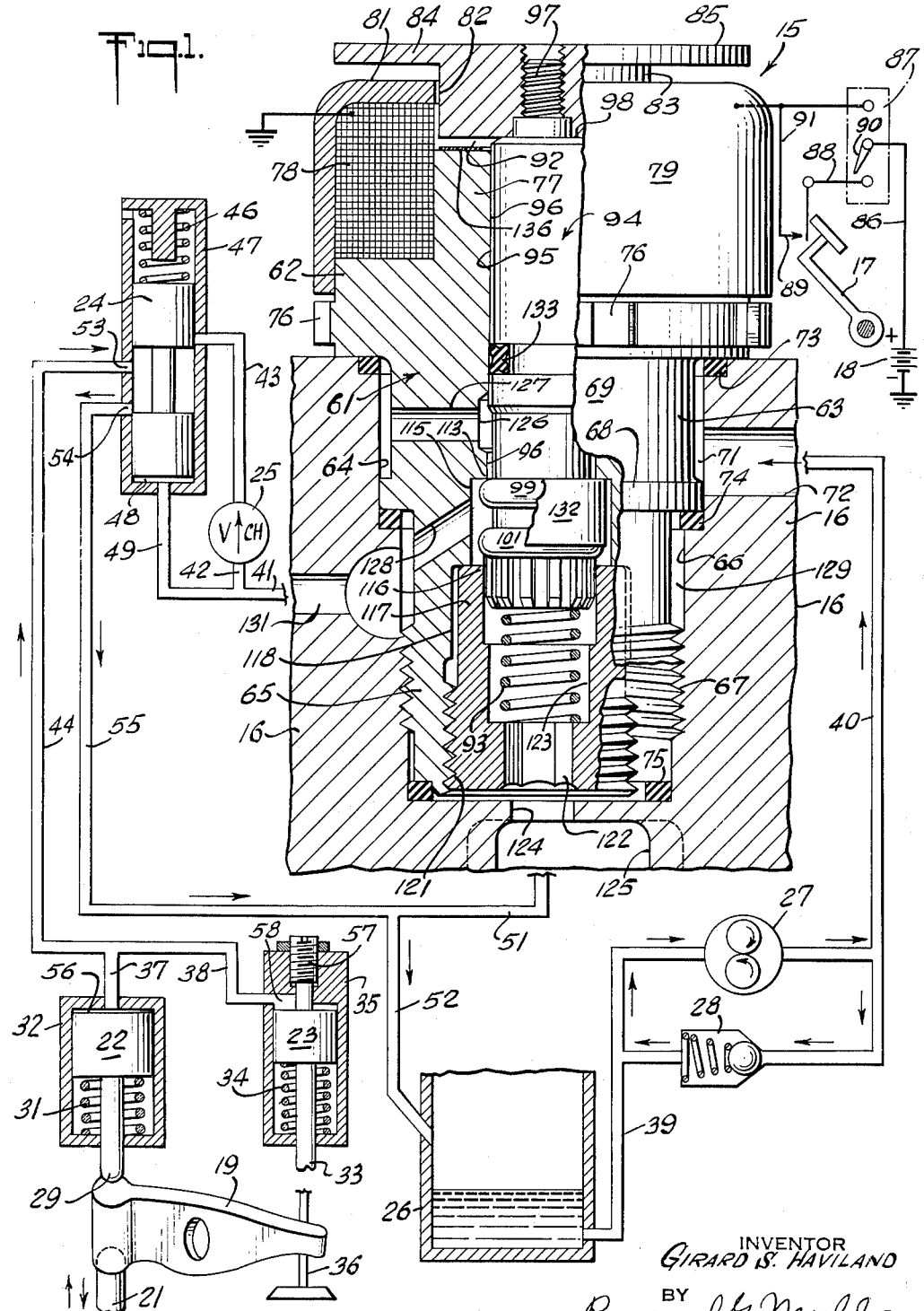

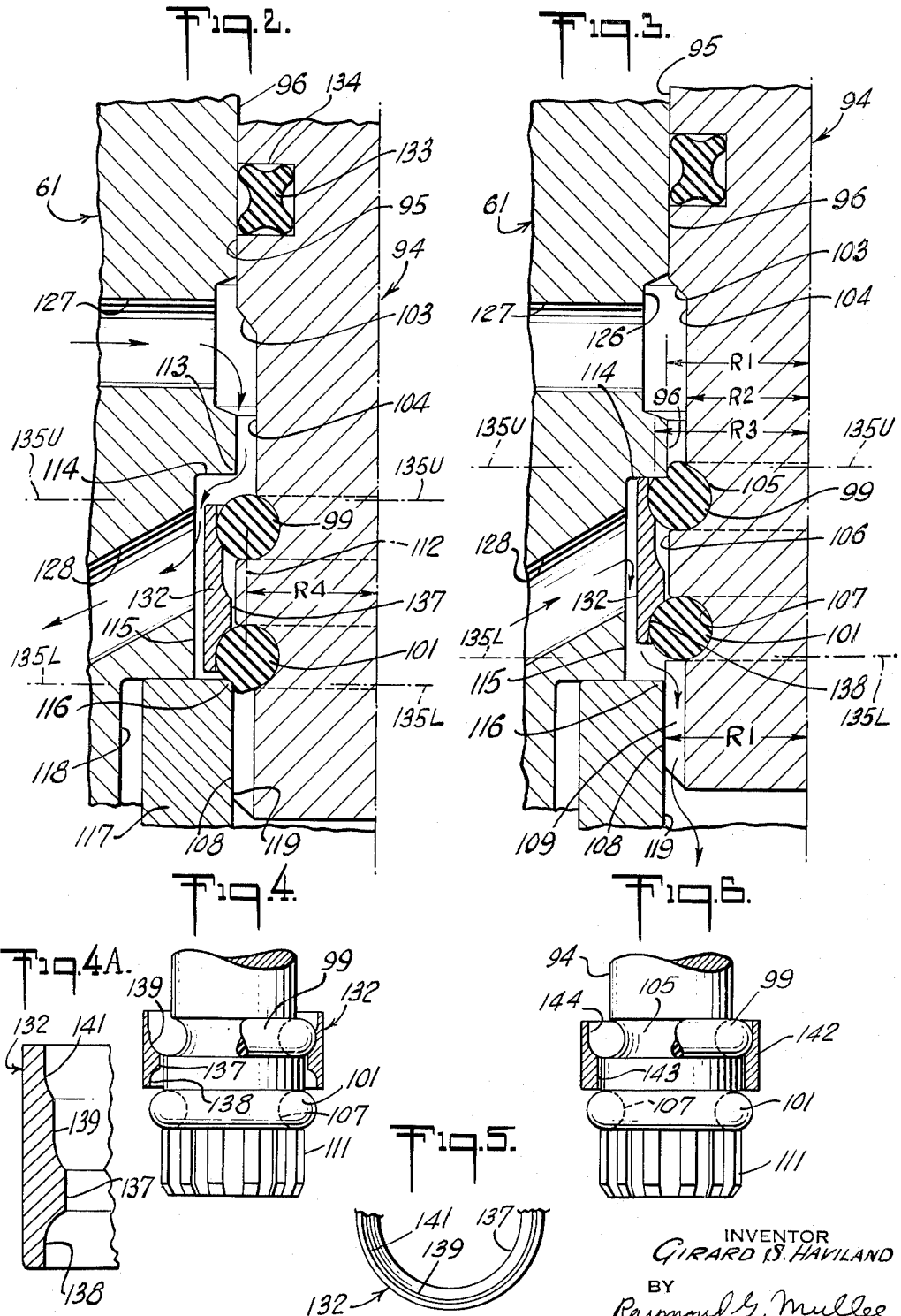

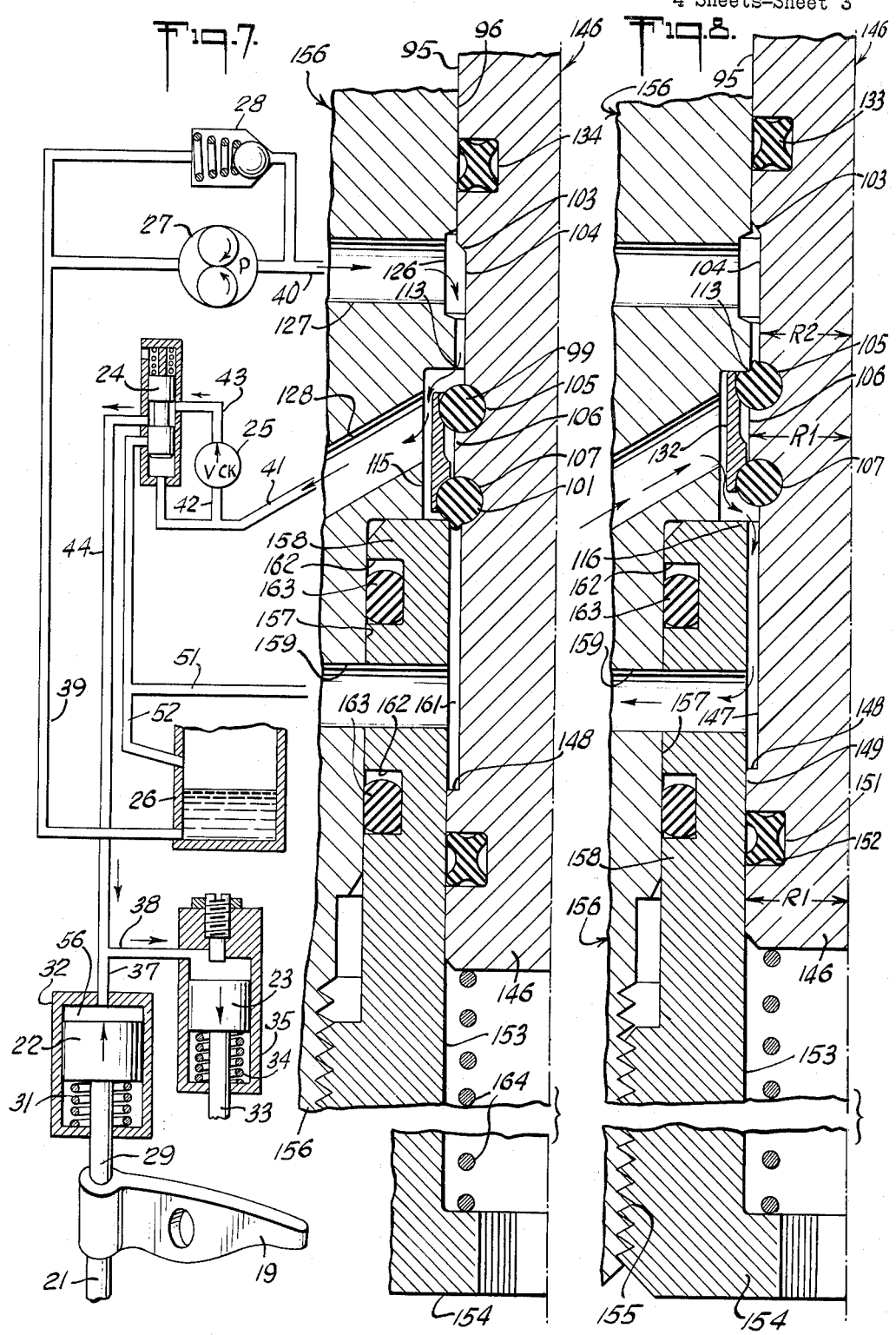

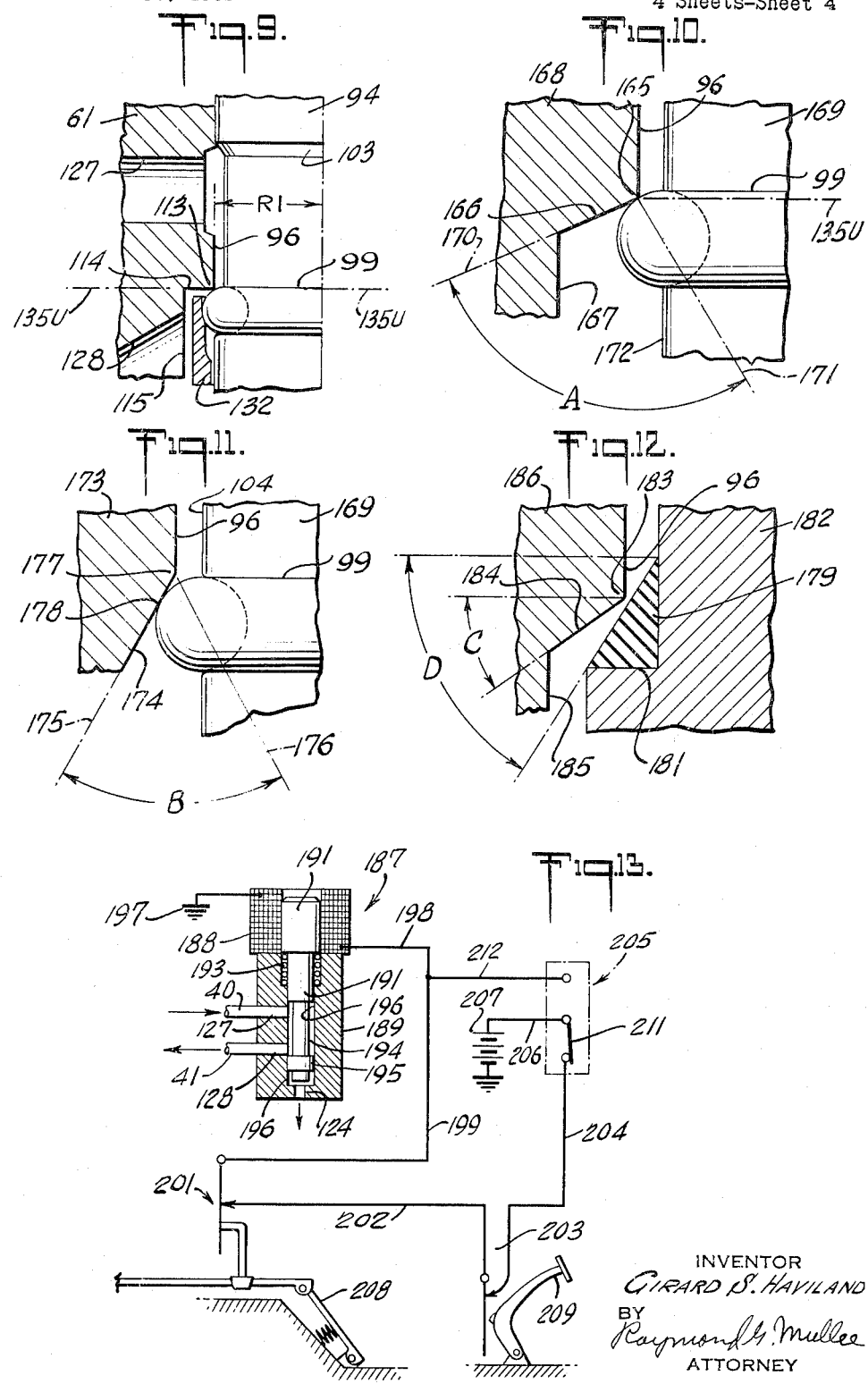

3,202,182
Patented Aug. 24, 1965

3,202,182
BALANCED POPPET VALVE
Girard S. Haviland, West Hartford, Conn., assignor to
The Jacobs Manufacturing Company, West Hartford,
Conn., a corporation of Connecticut
Filed Oct. 16, 1961, Ser. No. 145,298
4 Claims. (Cl. 137—625.27)

This invention relates to valves and more particularly to a three-way valve device operated by a solenoid and comprising an outlet port adapted to be connected alternatively with an inlet port under high pressure or with an exhaust port under low pressure.

The invention may be embodied, for example, in a solenoid valve forming part of a hydraulic control system which also includes a hydraulic signal circuit, the latter being arranged, in one position of the solenoid valve, to compel a slave piston to follow the reciprocating movements of a master piston. Such a signal circuit is used, for example, in a control system for converting the engine of a motor vehicle from a power producer to a retarder or self-braking device.

In that case, the signal circuit transmits the movements of the crankshaft to the discharge valve of each cylinder of the engine to exhaust the compressed air and thereby dissipate the potential energy in the cylinder at the end of the compression stroke. The signal circuit is connected through a set of separate valves to the outlet port in the three-way solenoid valve and when the latter is connected to the high pressure port the supply of oil in the signal circuit is maintained under the required minimum pressure. When the driver of the vehicle decides to re-convert the engine to a power producer or when the conversion is effected automatically, the solenoid valve is shifted to connect the outlet port to a low pressure line leading to the crankcase thereby relaxing the hydraulic pressure in the signal circuit and making the signal circuit unresponsive to the movements of any engine parts.

In an engine braking system, there are several solenoid valves, each independently controlling its own signal circuit, for example, three solenoid valves associated with three pairs of cylinders. It is desirable to operate each of the valves by means of a solenoid in order to make it respond quickly to changing highway conditions. However, conventional solenoid valves are unsuited for engine braking applications because the valve design inherently requires an actuator of such strength and length of stroke that the solenoid valve assembly would have to be of a size which is disproportionate to the restricted space available for engine controls. The length of the valve stroke is an important factor in determining the size of the solenoid actuator because it corresponds to the length of the magnetic gap between the armature and stationary coil in the de-energized condition, and a slight increase in the size of the gap would result in a very great increase in the amount of magnetizing force required for overcoming the reluctance of the gap.

An object of the present invention is the provision of a valve that can be actuated by a solenoid of extremely small size in relation to the capacity of the valve.

Another object is the provision of a three-way valve that has an extremely short stroke of movement of the spool from one seating position to the other, and which requires only a very light force to move the spool in either direction and yet provides a tight seal under high pressures.

A further object is substantially to eliminate friction in the movement of the valve.

Still another object is to eliminate the effects of hydraulic pressure on the spool insofar as it may oppose movement of the spool and therefore add to the force requirement of the solenoid or the opposing spring. In accordance with this object, the exposed surfaces of the moving spool are constructed and arranged in such manner and proportions that all of the hydraulic forces urging the spool in one direction are precisely and effectively balanced by hydraulic forces urging it in the other direction in any position of the spool.

A feature of this invention is a poppet valve arrangement including a spool having rings mounted thereon for engagement with the valve seats, the rings being arranged to arrest the movement of the spool as they become seated and without any sliding contact between the rings and the seats or surrounding valve body which might otherwise create friction and require the expenditure of work in moving the spool.

Another feature of this invention is a set of resilient rings each capable of making initial contact with the associated valve seat over a sharp circular edge, and to expand the area of valve seating engagement as the rubber is deformed under the stress of the solenoid or of the spring as the case may be.

Another object is to control the force of engagement, and the area of engagement, of the rubber ring against the upper seat when the spring is unopposed by the solenoid force. In accordance with this object, the impact of the spool against the upper seat is absorbed partly by the upper ring and partly by a sleeve which transmits the reactive force of the upper seat to the spool by way of the lower ring.

A further object is to retain the rubber rings and prevent them from being blown out of their supporting grooves under pressure. In accordance with this object the retainer function is performed by a sleeve which surrounds the rings and lies between the valve seats, the sleeve being arranged at the same time to perform the function of a limit stop device as previously mentioned.

A still further object is to improve the operation of a hydraulic control in an engine braking system.

Other objects and features of this invention will appear from the following description taken in connection with the accompanying drawings and appended claims.

In the accompanying drawings, in which like reference numerals indicate like parts:

FIG. 1 is a view, partly in longitudinal section and partly in elevation, of a solenoid operated poppet valve assembly embodying this invention, shown with a schematic diagram of an electric circuit for energizing the solenoid and also of a hydraulic system controlled by the valve;

FIG. 2 is an enlarged fragmentary longitudinal half section of the valve shown in FIG. 1, with the movable parts of the valve in the lower or operated position;

FIG. 3 is a sectional view similar to FIG. 2 but showing the movable parts of the valve in the upper or normal position;

FIG. 4 is a detail view of the lower end of the valve spool with the O-rings mounted thereon, and showing in section the retainer sleeve, these three elements being disassembled from the body and the sleeve being shifted upwardly to expose the lower O-ring for disassembly from the spool;

FIG. 4A is an enlarged fragmentary longitudinal section of the retainer sleeve;

FIG. 5 is a plan view of part of the retainer sleeve;

FIG. 6 is a view similar to FIG. 4 but showing a modified retainer sleeve;

FIG. 7 is an enlarged longitudinal half section similar to FIG. 2 but showing a modified porting arrangement for the valve and also showing schematically the hydraulic system as in FIG. 1, but with the elements thereof in their operated condition;

FIG. 8 is a view similar to FIG. 7 except that the valve is in the normal or de-energized position, and except further that the schematic diagram is omitted;

FIG. 9 is a fragmentary view of the valve of FIGS. 2 and 3 with the parts at the instant that the upper O-ring makes initial contact with the valve seat along a circular line of infinitesimal area;

FIG. 10 is a fragmentary view similar to FIG. 9 but on a further enlarged scale and showing a modified valve seat;

FIG. 11 is a fragmentary view similar to FIG. 10 but showing another modified valve seat;

FIG. 12 is a fragmentary view similar to FIG. 10 showing a modified shape of rubber sealing ring as well as a modified valve seat engageable with the ring; and FIG. 13 is a wiring diagram of a modified electric circuit for controlling the solenoid.

Referring to FIG. 1, the invention is illustrated as embodied in a solenoid valve assembly 15 mounted in a base frame 16 designed to be bolted to the engine block (not shown) of a motor vehicle engine. The vehicle includes the usual brake pedal 17 and electric battery 18; and the engine includes as conventional structure a rocker arm 19 adapted at its right end to depress a fuel injector plunger (not shown), and a vertically reciprocating push rod 21 arranged periodically to raise the left end of the rocker arm at one stage in each complete power cycle of the engine. The push rod 21 is lifted by a cam shaft (not shown) whenever the piston (not shown) in the associated engine cylinder is near the end of its compression stroke. A commercial example of an internal combustion engine of the type having rocker arms, push rods and valves located for convenient association with the control apparatus of the present invention may be found among the truck engines manufactured by Cummins Engine Company, Inc. which are four-cycle engines operating by compression ignition and having mechanical fuel injectors and overhead valves. It should be understood, however, that the present invention is not limited in its application to internal combustion engines but is applicable to a variety of machines which include a hydraulic circuit and a valve for cooperating with said circuit to control the transmission of motion from a master piston to a slave piston.

It has been proposed that a motor vehicle engine of the compression-ignition or "diesel" type may be converted from an engine to a compressor and, therefore, to a motion retarder or brake, by opening the discharge valve of each cylinder near the end of the compression stroke to exhaust the hot gasses and dissipate to the atmosphere the potential energy contained therein instead of permitting the gasses to expand and return the energy to the piston during the succeeding stroke. This principle of engine braking is explained more fully in an application for United States patent by Clessie L. Cummins, Serial Number 808,847, filed April 24, 1959, now abandoned. In that invention, Cummins proposes to simplify the control apparatus by taking advantage of the fortuitous circumstance that the most effective time in the cycle for opening the discharge valve for braking purposes happens to be the same time, or very nearly the same time, in the cycle when the fuel is ordinarily injected, that is, when the fuel would be injected if the engine were being used for generating power. Cummins, therefore, suggested that the engine be converted to a brake by disabling the fuel injector without discontinuing the periodic motion of the injector rocker arm and by transmitting the motion of said rocker arm through a hydraulic signal circuit to a valve lifter. The Cummins hydraulic signal circuit included a master piston reciprocating in unison with the up and down movement of the driving end of the injector rocker arm, and a slave piston which was arranged to operate the valve lifter. The hydraulic signal circuit was under the control of a set of valves so arranged that when the engine was conditioned for braking, a minimum pressure was maintained in the signal circuit to compel the slave piston to reciprocate in response to the reciprocations of the master piston and thereby lift the associated discharge valve; but on the other hand, when the engine was conditioned for delivering power, the pressure was released in the hydraulic signal circuit, allowing the slave piston and the master pitson to retract under the action of their respective springs into their cylinders thereby eliminating all contact between the signal device and the moving parts of the engine.

Some of the elements of the hydraulic circuit shown in FIGS. 1 and 7 are common to the circuit of the Cummins application aforesaid. These elements include the master piston 22, the slave piston 23, the control valve 24, the check valve 25, the lubricating oil sump or crank case 26, the gear pump 27 and the pressure regulating valve 28. The hydraulic circuit, when conditioned for engine retarding or braking as illustrated in FIG. 7, provides a locking connection between the injector rocker arm 19 and the slave piston 23. The hydraulic system comprises the master piston 22 with its plunger ram 29 and spring 31 in its housing 32 located above the injector rocker arm push rod 21; the slave piston 23 with its plunger 33 and spring 34 in its housing 35 located above the engine discharge valve 36; also a signal circuit including conduits 37 and 38 which establish communication at all times between the upper ends of the piston housings 32 and 35. When the master piston 22 is moved upward by the action of the push rod 21, a hydraulic force, transmitted through conduits 37 and 38 forces the slave piston downward and thus opens the discharge valve 36.

Fluid to energize the signal circuit may be drawn from the engine lubricating oil supply in the crankcase 26 through conduit 39 to the gear pump 27 which maintains the fluid under pressure in the conduit 40. The solenoid valve assembly 15, which will be described in detail later, then transmits the hydraulic fluid under pressure through conduits 41 and 42 past the check valve 25, conduit 43 through the control valve 24 and into the signal circuit 44, 37, 38 which forms a high pressure line and which transmits the force created by the upward movement of the master piston 22 to the slave piston 23. The pressure of the oil is regulated by the by-pass valve 28 arranged parallel to the gear pump 27.

With the parts in the FIG. 1 position, spring 46 in the housing 47 exerts a force on the control valve 24 which causes the oil in the chamber 48 to be drained out through the conduits 49 and 41, solenoid valve assembly 15 and through the conduits 51 and 52 back to the crankcase 26. When the control valve 24 has been pushed to the lower end of the chamber 48 by the spring 46, it establishes communication between the ports 53 and 54 in the control valve housing 47, and thereby connects the conduits 37, 38 and 44 of the signal circuit with the bleed conduits 55 and 52. The spring 34 can then force the slave piston 23 upward against the adjusting screw 37 (unless it happens to be there at that time), and retract the plunger 33 away from the engine valve 36, by expelling the oil in chamber 58 back through the control valve 24 and various bleed conduits 55, 52 to the crankcase 26.

In a similar manner, the spring 31 can then force the master piston 22 upward by displacing the oil in the chamber 56 and expelling it back to the crankcase 26. Plunger 29 also is thus retracted away from the rocker arm 19 so that the entire hydraulic valve opening mechanism required to convert the engine into a compressor is lifted out of the way when it is desired to have the engine run again as a power producer.

The spring 31 which acts against the master piston 22 is a relatively weak spring in that it never can be stiff enough to prevent the force created by oil pressure from the pump 27 of a normally well maintained engine from pushing the piston 22 and plunger 29 against the rocker arm 19 when the control valve 24 is set in the FIG. 7 position to condition the signal circuit for engine retarding. On the other hand, the spring 34 under the slave piston 23 must never be weak enough to allow lube oil pressure created by the pump 27 alone to force downward the piston 23 and plunger 33 when the control valve 24 is in the FIG. 7 position for engine retarding. For a more complete description of the operation of the hydraulic system shown in FIGS. 1 and 7, reference is made to the Cummins application aforesaid.

The solenoid valve assembly 15, which forms an important element in such a system, but which has been modified by this invention to improve the action of the system as a whole, will be described in detail presently. Generally speaking, the function of the solenoid valve assembly is to connect the control valve 24 and conduit 41 alternately with the low pressure line 51, as when the solenoid valve is in the de-energized position of FIG. 1; or with the engine pressure line 40, as when the solenoid valve is in the energized position of FIG. 7.

The solenoid valve assembly 15 includes a body member 61 having a head 62 seated atop the base frame 16, an intermediate portion 63 disposed within a counterbore 64 in the base frame, and a lower portion 65 disposed within a smaller bore 66 in the frame. The lower portion has a screw threaded connection 67 with the frame, and the intermediate portion 63 has a cylindrical surface 68 loosely fitting the counterbore 64 with a slight clearance therebetween. Above the cylindrical surface, the intermediate portion of the body member 61 has a neck 69 which is sufficiently reduced in diameter to provide an annular recess 71 of substantial size between the intermediate portion 69 and the counterbore 64. This annular recess communicates at all times with a radial port 72 in the frame which leads to conduit 40. The upper and lower ends of the annular recess 71 are sealed respectively by a rubber washer 73 engaging the lower end of the head 62 and by a second washer 74 which is interposed between the bottom of the intermediate body portion 63 and the bottom of the counterbore 64. A lower washer 75 is interposed between the bottom of the valve body 61 and the bottom of the frame bore 66. All three washers are resilient and are compressed simultaneously by turning the valve body 61 in the screw threaded connection 67 until the head 62 comes into direct metal to metal contact with the upper surface of the frame 16. The washers may be made of oil-resisting synthetic rubber. In order to facilitate tightening or loosening of the threaded connection, the head 62 is provided with a series of notches 76 adapted for cooperation with a suitable wrench (not shown).

At its upper end, the head 62 has an extension 77 which provides a stationary core for a solenoid coil 78. A cover 79 fits snugly around the circumference of the head 62 and the coil 78, and has an inturned flange 81 seated on top of the coil. The flange has a central opening 82 arranged to receive the body portion 83 of an armature 84 which projects into the coil 78. At its upper end, the armature has a disk portion 85 overlying the cover flange 81 and spaced therefrom. The coil 78 forms part of an electric circuit which may be energized from the battery 18, for example, by closing a circuit extending through conductor 86, a manipulative switch 87, a conductor 88, a foot switch 89, a conductor 91, and through the coil 78 to ground. In the circuit illustrated in FIG. 1, the foot switch 89 makes contact on application of pressure to the pedal 17 which may be the same pedal that operates the conventional friction brake associated directly with the wheels. Alternatively, the pedal 17 may be separate from the conventional brake pedal to permit the operator to retard the motion of the vehicle by applying self-braking action to the engine, independently of the friction brake. The manipulative switch 87 is of the single-pole, double-throw, center-off type and comprises a movable contact 90 which may be adjusted by hand to any one of three positions. In the center position shown in FIG. 1, it disconnects the battery 18 from the solenoid coil 78 and maintains the latter de-energized continuously regardless of the position of the brake pedal 17. When connected to the upper stationary contact, the movable contact 90 by-passes the foot switch 89 and maintains the coil 78 in energized condition. When connected to the lower stationary contact the movable contact 90 forms part of a series circuit with the foot switch 89 as above described, with the result that the coil 78 is energized only as long as the driver is pressing down on the brake pedal 17. Whenever the solenoid coil 78 is energized, the armature 84 is drawn downward by magnetic attraction until its lower face rests against the upper face of the valve body extension 77. When the solenoid coil is de-energized as illustrated in FIG. 1, there is a gap 92 between the armature 84 and the body extension 77. The armature is urged upward toward the FIG. 1 position at all times by means of a spring 93 which presses against the lower end of a spool 94.

The spool 94 has a cylindrical surface 95 near its upper end slidably fitting a bore 96 in the valve body 61. Above the cylindrical portion 95, the spool has an extension 97 screw threaded into the center of the armature 84. Between the cylindrical portion 95 and the screw threaded extension is a shoulder 98 on which the bottom of the armature seats. The spool 94 carries a pair of resilient sealing rings 99 and 101, each of toroidal shape, made of oil-resistant resilient synthetic rubber, and commercially known as O-rings. These rings are arranged in a novel manner with relation to the spool and the fixed parts of the valve assembly.

Before entering into a detailed description of the arrangement of the rings, valve seats, passages, etc., it should be explained first that this arrangement is a very important factor in determining the overall size, weight and bulk of the solenoid valve assembly 15 and has made possible the design of a valve assembly capable of installation in close quarters which are too limited for the reception of a conventional valve assembly; and yet adequate to satisfy the exacting demands on the hydraulic system with respect to quick action, minimum resistance to flow, high rate of flow, resistance to high pressures without leakage, etc. The problem of space restriction is particularly acute in the case of conventional engines which were originally designed with no thought of adding any valves or other control apparatus for converting the engine into a brake. In the case of such engines, it is necessary to find room for three complete solenoid valve assemblies, each associated with its control valve and individual signal circuit, all within a very limited space at the top of a single engine. Prior to the advent of the present invention, the basic principles of engine braking or retardation (by opening a discharge valve at the proper time in the cycle to convert the engine into a compressor) were well known. However, previous attempts to apply these principles to a conventional commercial engine by means of a simple conversion unit or kit, adapted for convenient attachment to the engine, fell short of the requirements of the industry because of the lack of an acceptable solenoid valve. The engine braking controls using conventional valves required external plumbing with very clumsy and space-consuming attachments to the engine. The most compact valves available, which could not be fitted under the cover of the engine, had limitations of pressure and flow that made the operation sluggish. Efforts to obtain a valve that would go under the cover of the engine, as the present invention does, were a complete failure. There was no valve available on the market that would be capable of operating with the flow rates and the pressure rating within the space limitations. Moreover, repeated attempts were made, with the cooperation of several manufacturers of valves, to design a solenoid valve for this special application, but all of such attempts, prior to the present invention, were unsuccessful for one reason or another.

The present invention has solved the problem and, therefore, has made possible the application of an engine brake to a conventional commercial engine, by the design of a special type of balanced poppet valve, having adequate capacity, limited dimensions, extremely short stroke, a minimum force for moving the valve in either direction and yet adequate in sealing pressure capacity, greater flow, quick action, and the like. By reducing the stroke or movement of the spool 94 from one extreme position to the other, the present invention reduces the axial length of the gap 92 between the armature 84 and the valve body 61. The reduction in the size of the gap is of extreme importance because it reduces the magnetic reluctance (when in the de-energized position of FIG. 1) of the magnetic circuit to a fraction of its previous value thereby effecting a corresponding reduction in the strength of the magneto-motive force required to pull the armature as compared with conventional solenoid valve assemblies. The reduction in the required magneto-motive force of course results in a corresponding reduction in the number of ampere turns of the wire and hence the size of the coil 78. By balancing the hydraulic pressure on the poppet valve, as will be described later, the present invention makes possible a further reduction in the requirements for magnetic force and also the force of spring 93, and therefore in the dimensions of the complete assembly because neither the solenoid coil nor the spring at any time spends any part of its force in overcoming hydraulic pressure on the spool, as in the case of prior unbalanced valves. Reducing the force of the spring, of course, reduces the required magnetic force to overcome the spring when the coil 78 is energized.

The spool 94, as best illustrated in FIGS. 2 and 3, has a downwardly tapering shoulder 103 extending between the upper cylindrical surface 95 aforementioned and a second cylindrical surface 104. For convenience of discussion, the radius of the bore 96, and of the second cylindrical surface 104 will be designated R1 and R2 respectively as shown in FIG. 3. At the bottom of the second cylindrical surface the spool has an annular groove 105 for the reception of the upper O-ring 99. Below the annular groove the spool has a third cylindrical surface 106 which extends down to a lower annular groove 107 for the reception of the lower O-ring 101. Below the lower annular groove 107, the spool has a fourth cylindrical surface 108 which, however, is not continuous but consists of discrete segments of a cylindrical surface interrupted by longitudinal grooves 109 thereby presenting a fluted structure 111 as shown in elevation in FIGS. 4 and 6. The third cylindrical surface 106 and the fourth cylindrical surface 108 each has a radius equal to that of the first cylindrical surface 95.

Each annular groove 105 and 107 is of arcuate shape throughout most of its cross section. In the case of the upper groove 105, the circular arc extends from the second cylindrical surface 104 around the inside of the O-ring and up to a point along the bottom of the O-ring which intersects an imaginary cylinder 112 whose surface, if extended, would coincide with the centers of the arcs in the grooves 105 and 107. The imaginary cylinder 112 has a radius R4 (FIG. 2) which is greater than R2 but less than R1. The bottom of the annular groove 105 is flat and level from the imaginary cylinder R4 outward to the peripheral surface 106. The lower annular groove 107 is arcuate along the inside portion which lies within the confines of imaginary cylinder 112, and is flat and level at the top and bottom outwardly of cylinder 112 to the peripheral surfaces 106 and 108 respectively.

In accordance with this invention, the O-rings 99 and 101 are arranged to reciprocate between their respective valve seats for a short stroke with a poppet valve action. The upper seat 113 is formed at the inner corner of a shoulder 114 which extends from the bore 96 to a counterbore 115 in the valve body 61. The lower seat 116 is formed at the inner corner of the top face of a screw 117 which is rigidly supported within a lower enlarged counterbore 118 in the valve body. The top face of the screw has a flat level surface which lies in the same plane as the lower valve seat 116 and which is fitted tightly against the upper wall of the counterbore 118. The inner edge of the top face, and therefore of the valve seat 116, is defined by a cylindrical bore 119 slidably fitting the broken cylindrical surface 108 at the lower end of the spool 94. The bottom portion of the screw 117 has a screw-threaded connection 121 (FIG. 1) with the bottom portion 65 of the body member 61 and also has a central polygonal opening 122 for the reception of a hex key (not shown). Above the opening 122 the screw has a counterbore 123 which encloses the spring 93. The spring, which is relatively weak in comparison with those in conventional solenoid valve assemblies, is under precompression and is interposed between the bottom wall of counterbore 123 and the bottom face of the spool 94.

The space below the lower valve seat 116 communicates at all times with the low pressure side of the hydraulic system through the longitudinal grooves 109, counterbore 123, hexagonal opening 122, exhaust port 124, recess 125 and conduits 51 and 52 leading back to the crankcase 26. The space above the upper valve seat 113 communicates at all times with the high pressure side of the hydraulic system through the bore 96, annular recess 126, inlet port 127, annular recess 71, radial port 72, and conduit 40 which receives pressure from the high side of gear pump 27. The counterbore 115 in the body member 61 communicates at all times with the control valve 24 through outlet port 128, an annular space 129 between body 61 and frame 16, radial port 131 and conduit 41.

Incidentally, some of the oil delivered to the conduit 41 through the ports and recesses just described passes through other branch lines in addition to those illustrated in FIGS. 1 and 7. These other branch lines form no part of the present invention except to the extent that they increase the burden on the capacity of the solenoid valve assembly 15 and render the engine brake hydraulic circuit incompatible with conventional low capacity valves. In the design of the present invention, however, the oil delivering passages are all of sufficient cross sectional area to meet the needs of an engine braking system and to deliver high pressure oil in the required volume and rate of flow without loss of pressure or unbalancing of the spool 94.

When the spool 94 moves upward from the FIG. 2 toward the FIG. 3 position, the upper O-ring 99 makes initial contact with the upper seat 113 along a sharp edge defining a circle of radius R1 as shown in FIG. 9. Although the spring 93 is relatively weak, its force is concentrated at first over an infinitesimal area around the sharp edge of valve seat 113 causing the resilient rubber in the ring to yield. The rubber is deformed to permit the spring 93 to expand further until the O-ring 99 and spool 94 come to rest in the position shown in FIG. 3, where the O-ring has sealing engagement with the valve seat over an annular area lying between the circles R1 and R3. The advantages of sealing over a surface of finite area (as shown in FIG. 3), as compared with sealing over a line of infinitesimal area (as shown in FIG. 9) are to eliminate the need for close manufacturing tolerances and special machining operations, and to prolong the life of the valve by avoiding the destructive effects of impacts of the valve rings against the seats. On the other hand, the advantage of sealing along a line of infinitesimal area as shown in FIG. 9, as compared with a surface of finite area as shown in FIG. 3, is that the initial sealing pressure (between the O-ring 99 and the corner 113) is greater for any given spring force and, therefore, can seal a larger maximum pressure difference of the oil above and below the valve seat. In accordance with this invention, the required sealing area is attained first by making contact over a sharp edge and then by spreading out the contact from a line to an annular area as the rubber ring is deformed. This is accomplished in the present invention while at the same time gaining all of the advantages of a poppet valve arrangement in which the valve ring reciprocates on a very short stroke between two axially spaced walls or valve seats which arrest the movement of the ring and spool at the end of the stroke without requiring any sliding action between the ring and the seat. In prior attempts to design a solenoid valve assembly for this purpose, the required sealing area was obtained by causing the O-ring to slide along a cylindrical surface corresponding to the valve seat. This sliding action not only lengthened the stroke of the valve spool (and hence the size of the magnetic gap and of the coil) but also introduced friction between the O-ring and the surrounding cylinder, thereby requiring work to be done by the spring and solenoid to overcome the friction with a further increase in the size of the solenoid valve assembly. In the design of the present invention, the O-ring 99 does not slide along the surface of the bore 96 in the body 61, or along any other surface and, therefore, when the solenoid coil 78 is energized, it does not have to overcome any frictional resistance on the upper ring 99 in moving the latter from the fully seated position of FIG. 3 to the intermediate position of FIG. 9 where the O-ring breaks contact with the seat.

The lower O-ring 101 engages the lower seat 116 in the same manner as previously described with relation to the upper O-ring and seat except that the lower ring is engaged by magnetic attraction and disengaged by the spring 93. The effect of this transposition of forces on the function of the O-ring is that during the movement of the lower ring 101 toward seated position, both the magnetic force and the spring force on the spool 94 are increasing, whereas during the upward movement of the upper ring 99 toward the seated condition of FIG. 3, the force which moves the spool diminishes as the spring 93 expands and there is no opposing magnetic force to compensate for the reduction in spring pressure.

The arrangement for establishing a hydraulic balance on the spool 94 and O-rings carried thereby, will be described presently. Before entering into a detailed discussion on this point, it should be noted that the sleeve 132 which surrounds the O-rings 99 and 101, is designed to function as a retainer and also as a limit stop device to improve the operation of the valve, but could be omitted if desired. To avoid confusion and to facilitate an understanding of the balancing forces, the first part of the discussion of the balancing pressures will disregard the effect thereon, if any, of the retainer sleeve 132.

The hydraulic forces on the spool 94 and rings 99 and 101 acts in various directions, some of these forces being axially upward, others axially downward, others radially inward and others oblique with both axial and radial components. All of the radial forces and radial components of oblique forces are balanced due to the fact that they are evenly distributed throughout 360° of the circumference of the spool. It is necessary, therefore, only to consider the axially directed forces and the axial components of oblique forces. When the spool 94 is in the upward position shown in FIGS. 1 and 3, and the inlet port 127 is maintained under constant high pressure by the pump 27 and regulating valve 28, the high pressure oil in the adjacent recess 126 is in a static condition, being sealed off at the bottom by the engagement of O-ring 99 with upper valve seat 113, and being sealed off at the top by a close fit between the spool surface 95 and the bore 96 in the body 61. Any oil that may attempt to seep through the close fit would be closed off by the quad ring 133 mounted in an annular recess 134 in the valve spool 94. For a further discussion of the construction and function of the quad ring, reference is made to United States Patent Number 2,954,264 granted September 27, 1960, to Tisch et al.

On top of and above the quad ring 133, the spool 94 is subjected to atmospheric pressure acting downwardly over an area equal to that of the bore 96 which has a radius of R1. At the lower end of the spool there is pressure acting upwardly over the same effective area, inasmuch as the bore 119 has the same diameter as bore 96. As long as the space 123 at the bottom of the spool is maintained at the same (atmospheric) pressure as the space at the top, the spool will be balanced as far as its ends are concerned. It will be demonstrated that the hydraulic forces acting on the spool between its ends are also precisely balanced in every position of the spool.

For convenience of discussion, the spool 94 will be considered as consisting of three sections as follows: an upper section lying above the plane 135U of initial contact of upper O-ring 99 with upper valve seat 113, as shown best in FIG. 9; a lower section lying below the plane 135L of initial contact of lower O-ring with seat 116; and an intermediate section lying between the cross-sectional planes 135U and 135L. The imaginary plane 135U is so located relative to the spool 94 and ring 99 that the outside diameter of the ring in the plane of cross section 135U is precisely equal to that of the bores 96 and 119 which have a radius of R1. The plane 135U is fixed relative to the spool 94 and therefore is movable relative to the body 61 and seats 113 and 116. In the FIG. 9 position, the plane 135U is aligned with the plane of the shoulder 114, which includes the valve seat 113. In the FIG. 3 position, plane 135U lies slightly above the level of shoulder 114. The cross sectional plane 135L is similarly located relative to the lower ring 101 and seat 116.

Considering first the upper section which lies above plane 135U (by disregarding the atmospheric pressure above quad ring 133 for reasons above mentioned), there is a balance of hydraulic pressures within the upper section. The high pressure oil in recess 126 exerts a force on the upper zone of the O-ring 99 (within the circle R1 delineated by cross sectional plane 135U) tending to move the spool down. The downward axial component of force is equal to the pressure (force per unit area) in recess 126 multiplied by the effective area in the zone on the O-ring which is exposed to such pressure; such effective area being equal to pi multiplied by the difference between the squares of radii R1 and R2. At the same time, the high pressure oil exerts a force on the downwardly tapering shoulder 103 tending to move the spool 94 upward. Assuming, for the same of simplification, that the speed surface 95 has the same diameter as bore 96, the axial component of such upward force is equal to the pressure in the recess 126 multiplied by the effective area of shoulder 103; the latter being equal to pi multiplied by the square of R1 minus the square of R2. Since the product in both equations is identical, it follows that all hydraulic pressures on the upper section of the spool are in perfect balance. In commercial practice, there will be a slight clearance between the outer cylindrical surface 95 of the spool and the wall of bore 96 in the body. This clearance space, however, will not affect the balance inasmuch as the outer diameter of the quad ring 133 is always precisely equal to the diameter of bore 96 (whose radius is R1) and, therefore, the lower surface of the quad ring will perform, in whole or in part, the function previously attributed to the shoulder 103, namely of providing an upward force which balances the downward force on ring 99 above the plane 135U.

Below the plane 135L, that is, in the lower section of the spool, there are no unbalanced hydraulic pressures because there is only atmospheric pressure acting upward on the spool over an effective area of a circle of radius R1, and this is balanced by atmospheric pressure on top of the spool, above the quad ring 133, having the same effective area as evident from FIG. 1, as previously described.

It can be demonstrated that there is a balancing of hydraulic pressures on the intermediate section of the spool and O-rings lying between the planes 135U and 135L. Hydraulic pressure acting upward against the bottom part of the upper O-ring 99 is obviously balanced by the same pressure acting downward against the top part of the lower ring 101, since the areas are equal. The only question remaining is whether or not the pressure on the bottom part of the lower ring 101 outward of radius R1 balances the pressure on the top part of the ring 99 outward of the radius R1. Again, it is obvious that in these limited segments under consideration, there is perfect balance outwardly of the radius R3. It might appear at first glance that there is an unbalance over the area which lies between the circles R1 and R3 because the top part of upper ring 99 lying between these radii, when in the FIG. 2 position, is exposed to hydraulic pressure not opposed by hydraulic pressure over a corresponding area on the bottom surface of lower O-ring 101. The unbalance is only theoretical and not real because the area in question, corresponding to the area of sealing, is the result of internal strains in the rubber of the lower O-ring 101. The deformation of the rubber sets up a reactive force opposing the hydraulic pressure acting over the corresponding area at the top of the upper O-ring, and the reactive force would tend to move the O-ring 101 and spool upward to a position of initial contact of ring 101 with seat 116 (comparable to the initial contact shown in FIG. 9), if the force of the spring 93 and of the solenoid 78 were both removed. When the rubber 101 is not under strain and engages the seat 116 over a sharp edge, the area of sealing engagement vanishes and all the areas on the spool assembly in the intermediate section are then obviously in perfect balance. By similar analysis and comparison of the various areas on the valve it can be demonstrated that in any position and under all conditions the spool is hydraulically balanced and the only force which the solenoid must overcome is the force of the spring and vice versa.

In the foregoing discussion, consideration was given to the static forces, and the pressure on one side of the valve seat was assumed to be uniformly high, and on the other side to be uniformly low. When the oil is flowing through the valve there may be a slight dynamic unbalance under certain conditions but experiments with commercial constructions of the valve have shown that such dynamic unbalance, if any, is neither substantial nor detrimental and may possibly improve the action of the valve by causing it to move quickly from one seat to the other after the unseating motion has been started by an overpowering of the spring by the solenoid magnetic force, or by the sudden removal of the solenoid force, as the case may be.

When the solenoid coil 78 is energized, either by manipulation of the switch 87 or by depression of the pedal 17, the armature 84 is attracted downward and pushes the spool 94 against the opposition of spring 93. As the upper O-ring 99 moves downward, it restores its shape to a circular cross section while reducing the area of sealing engagement with the seat 113 from the annular area (R3 minus R2) shown in FIG. 3, to the circular line contact shown in FIG. 9. At that instant, every surface portion which is exposed to downward hydraulic pressure is balanced by another portion exactly equal in effective area and exposed to upward hydraulic pressure of the same intensity, and this equality of effective areas persists throughout the downward motion of the spool until the lower O-ring 101 makes initial contact over a thin circular line at the corner of the lower valve seat 116 comparable to the contact between the upper ring and upper seat as shown in FIG. 9. At this time, pressure of the oil in the counterbore 115 is higher than it was when the parts were in the FIG. 3 position, but the admission of high pressure fluid between the O-rings does not disturb the balance of the valve. During the downward movement of the spool 94 the magnetic gap 92 closes, thereby increasing the magnetic downward force on the spool at a greater rate than the increase in the resistance of the opposing spring 93, as a result of which the spool 94 is accelerated until its motion is arrested abruptly by impact against the lower valve seat 116. The impacting force, due to the momentum of the spool 94 and the continued application of magnetic force on the armature 84 is absorbed partly by the rubber ring 101 which is deformed to the shape illustrated in FIG. 2, but mostly by the upper face of the core 77 which acts as an anvil for the armature 84. If desired, a thin Mylar washer 136 may be laid on the anvil surface.

With the parts in the operated position of FIG. 2, high pressure oil flows from the gear pump 27 through conduit 40, port 72, recess 71, inlet port 127, recess 126, bore 96, over disengaged seat 113, into counterbore recess 115, through outlet port 128, annular space 129, radial port 131 and conduit 41. All of the passages just mentioned are of adequate cross sectional area throughout to insure a high rate of flow without reduction in pressure. The live pressure fluid in conduit 41 lifts the control valve 24 to the FIG. 7 position, and this pressure is maintained by the flow through the solenoid valve assembly 15 during the succeeding stage of operation of engine braking during which the pressure pulsates in the signal circuit 37, 38 and 44 to transmit the upward movement of the master piston 22 into downward movement of the slave piston 23 as previously described.

The spool 84 remains in the FIG. 2 position, and the engine braking stage of operation continues, as long as the solenoid coil 78 is energized. But when the electric circuit is broken, by opening either switch 89 or 87, the coil 78 is de-energized and the spring 93, being unopposed by any other pressure acting on the spool, projects the spool upward until its motion is arrested by impact against the upper seat 113. The impacting force, due to the momentum of the spool and the pressure of spring 93 is absorbed partly by the rubber ring 99 which is deformed to the shape illustrated in FIG. 3, and partly by the retainer 132 as will be described later. On termination of the impact, the rubber ring 99 is retained in its deformed condition as shown, under the continued application of spring pressure, as long as the solenoid coil 78 remains de-energized.

With the parts in the position shown in FIGS. 1 and 3, the oil is drained from conduit 41 through port 131, annular recess 129, port 128, counterbore recess 115, between the lower ring 101 and the disengaged seat 116, through the longitudinal grooves 109, counterbore 123, opening 122, outlet port 124, recess 125 and conduits 51 and 52 back to the crank case. The control valve 24 thereupon moves under the pressure of spring 46 back to the FIG. 1 position where it remains to permit the engine to deliver power without transmitting the motion from the master piston 22 to the slave piston 23.

It has been found that when the valve parts are in the FIG. 3 position, the oil has a tendency to seep between the O-ring 99 and the upper part of the groove 105 in which the ring is mounted, and urges the ring radially outward. Such outward force is not opposed in the usual manner, as in the case of conventional valves having a sliding fit between the O-rings and a surrounding sleeve. Therefore, in the absence of a special retainer, the hydraulic pressure fluid may, under certain conditions, stretch the ring 99 and blow it out of the groove 105. In order to prevent this, and also to accomplish a secondary function, the retainer 132 is provided.

As illustrated in FIGS. 2, 3, 4 and 4A the retainer 132 consists of a one piece metal sleeve having a smooth cylindrical periphery of a diameter sufficiently small to leave a clearance space within the valve body recess or counterbore 115 for the adequate flow of hydraulic pressure fluid. The interior of the sleeve comprises a bore 137 of a diameter slightly exceeding that of the third cylindrical surface 106 on the spool. Below the bore the sleeve has a counterbore 138 for receiving the lower O-ring 101. Above the bore, the sleeve has an intermediate counterbore 139 and an upper counterbore 141. Each counterbore is cylindrical for the major portion of its length. The lower ends of the upper and intermediate counterbores and the upper end of the lower counterbore are curved to conform with the toroidal shape of the respective rubber rings 99 and 101. The cylindrical portions of the upper and lower counterbores 141 and 138 are of such diameter as to fit the rubber rings without deforming them, but the intermediate counterbore 139 is slightly reduced in diameter. As long as the retainer sleeve 132 is located between the valve seats 113 and 116, neither the O-rings nor the retainer ring can be removed from the spool 94 and the O-rings cannot be forced out of the grooves 105 and 107 by hydraulic pressure or by any other means. In order to disassemble these parts, it is first necessary to remove the screw 117 from the valve body 61 and detach the sub-assembly comprising the spool, O-rings and retainer. The retainer sleeve 132 is then forced upward to the FIG. 4 position to compress the upper ring 99 and squeeze it into the intermediate counterbore 139. In the FIG. 4 position, the lower O-ring 101 is exposed and can be expanded by means of a screwdriver or pointed tool, and pried loose from the annular groove 107 after which it is stretched and pulled over the fluted end 111 of the spool. The retainer sleeve 132 can then be dropped from the end of the spool 94.

The sleeve 132 serves another function in providing a positive limit stop for controlling upward movement of the spool 94 relative to the body 61. When the spool is lifted by the pressure of spring 93, the upper O-ring 99 at first engages the sharp corner of the valve seat 113, as shown in FIG. 9, to provide a sealing surface of infinitesimal area along a thin circular line. At the instant of such initial contact between the valve ring and valve seat, the upper extremity of the retainer 132 is located below the seat. The spool 94 continues moving upward as a result of its momentum and the continued application of pressure from spring 93 but the upward movement beyond the FIG. 9 position is opposed by the elasticity of the rubber in ring 99, which acts as a bumper or shock absorber. Near the end of the stroke, the upward movement is further resisted by the sleeve 132 which engages the body shoulder 114 with metal-to-metal contact and provides a substantially positive limit stop for such upward movement of the spool. However, the limit stop is somewhat yielding as the reactive force is transmitted from the sleeve 132 downward through the lower counterbore 138 and lower ring 101 and groove 107 to the spool 74. By changing the length of the sleeve 132, it is possible for the designer of the valve assembly to regulate the stroke of the spool 94 and the area of sealing contact.

For example, if the axial length of the sleeve 132 is increased and all of the length is added to the cylindrical portion the upper counterbore 141, the gap between the sleeve and shoulder 114 in the FIG. 9 position will be correspondingly reduced, resulting in a reduction in the axial length of the remaining portion of the upward stroke of the spool and a reduction in the radius of the circle R3 (FIG. 3), and in the sealing area lying between circles R3 and R2, and in the amount of deformation of the upper O-ring 99. At the same time that the sleeve 132 relieves the stress on the upper O-ring 99 it transfers the stress to the lower O-ring 101 as previously described. However, it is contemplated that the unseated O-ring 101 will never be under as much stress as the seated O-ring 99, with the parts in the FIG. 3 position, regardless of the dimensions of the sleeve 132. By adjusting the length of the retainer sleeve it is possible to control the area of the sealing surface at the valve seat and, therefore, the amount of pressure that the O-ring 99 can resist.

In a similar manner, the retainer sleeve 132 may be lengthened by adding to the axial length of the cylindrical portion of the lower counterbore 138, thereby causing the lower extremity of the sleeve to limit or abut against the top of the screw 117. In actual practice, however, it has been found that the function of limiting the lower end of the stroke of the spool 94 need not be performed by the retainer sleeve 132 as it is accomplished effectively by the engagement between the armature 84 and the Mylar washer 135 on top of the valve body extension 77.

An advantage of using the retaining sleeve 132 as an upper limit stop device for the spool 94, instead of limiting such movement by direct engagement between cooperating shoulders integral with the spool 94 and body 61 respectively, is that the present invention simplifies the construction of the valve body 61 and permits the use of cylindrical bore 96 of uniform diameter from the high pressure inlet recess 126 to the top extremity of the valve body. In prior arrangements of limit stops, there was an inwardly projecting shoulder near the upper end of the bore in the valve body for engaging the spool, and it was found that the provision of such a shoulder not only complicated the construction of the valve body and increased the cost of machining the inner surfaces, but also permitted pressure to build up between the limit shoulders on the valve body and spool with the result of unbalancing the valve. With the present design, however, in the event that any oil should seep upward past the quad ring 133 under extremely high pressures, the oil would not have access to any unbalancing shoulders but would be permitted to escape at the upper end of the spool 94.

FIG. 6 shows a modified retainer sleeve 142 designed to provide more restraint against the expansion of the upper O-ring 99, but at the expense of the lower O-ring 101 which is no longer restrained but which does not need the same degree of protection because the pressures tending to blow it out of the groove are less than those acting on the upper ring. Sleeve 142 comprises a bore 143 and a counterbore 144 corresponding in function to the bore 137 and upper counterbore 141 respectively in the retainer 132. However, the modified retainer 142 is cut off at the lower end of the bore 143 leaving the lower O-ring 101 exposed at all times. The modified design obviates the need for moving the retainer 142 upward of its usual operating position in order to disassemble the lower O-ring and eliminates the need for the intermediate counterbore 139 as in the retainer 132. With the parts in assembled position as shown in FIG. 6, the lower end of the modified retainer sleeve 142 is in line with the upper side of the groove 107 whereas the upper extremity lies just below the upper side of the groove 105 in the spool 94. The modified counterbore 14 has a cylindrical portion of greater axial length than that of the corresponding portion in the retainer 132. The additional length lessens the danger of a blow-out of the upper ring 99 between the valve seat 113 and the upper end of the retainer.

FIGS. 7 and 8 show a three-way balanced poppet valve assembly similar to that of FIGS. 2 and 3 but modified to provide three ports, each adapted to be connected by a pipe and so arranged that pressure may be supplied if desired to any one of the three ports. The modified assembly comprises a spool 146 whose upper portion is the same as in the spool 94 and includes the above described cylindrical surfaces 95, 104, 106, the annular recess 134 for supporting the quad ring 133, the downwardly tapering shoulder 103, and the grooves 105 and 107 for supporting the rubber O-rings 99 and 101. Below the groove 107, however, the spool 146 is modified as compared with the spool 94 and comprises a fourth cylindrical surface 147 extending from the O-ring recess 107 to a shoulder 148, and a fifth cylindrical surface 149 extending from said shoulder to the lower extremity of the spool. The fourth cylindrical surface 147 has the same diameter (and radius R2) as the second cylindrical surface 104, while the fifth cylindrical surface has the same diameter (and radius R1) as the first and third cylindrical surfaces 95 and 106. Accordingly, the shoulder 148 has the same effective area (pi times the difference between the squares of R1 and R2) as the downwardly tapering shoulder 103. The fifth cylindrical surface is interrupted by an annular recess 151 which receives a quad ring 152 which are similar in construction and function to the recess 134 and quad ring 133. The fifth cylindrical surface and the quad ring 152 have a sliding fit with a bore 153 in a screw 154. On its exterior, and at the bottom portion thereof, the screw has a threaded connection 155 with a valve body 156. The upper part of the body 156 is like the body 61 in FIGS. 2 and 3 and comprises a bore 96, an annular recess 126 and a counterbore 115. An inlet port 127 establishes communication at all times between the annular recess 126 and the conduit 40 leading to the high pressure side of pump 27. An outlet port 128 establishes communication at all times between the counterbore 115 and the conduit 41 leading to the control valve 24 for the signal circuit. The upper wall of the counterbore 115 provides a stop shoulder for the retainer sleeve 132 and also comprises an upper valve seat 113 engageable with the O-ring 99 as previously described in connection with the embodiment illustrated in FIGS. 2, 3 and 9.

Below the counterbore 115, the body 156 has a lower counterbore 157 which receives, with a tight fit, an upper extension 158 on the screw 154. The upper extremity of the extension 158 comprises a flat horizontal surface, the outer portion of which seats firmly against the closed end of counterbore 157 and the inner edge of which provides a seat for the O-ring 101. An exhaust port 159 extends radially through the extension 158 and the registering portion of the body 156. The exhaust port establishes communication at all times between an annular recess 161 in the spool 146 (above the shoulder 148) and the conduits 51 and 52 leading to the lubricating oil sump or crankcase 26. In order to prevent leakage along the wall of the lower counterbore 157, the screw extension 158 is provided with a pair of annular grooves 162, one above and one below the exhaust port 159, each groove receiving a sealing ring 163.

The operation of the modified poppet valve assembly of FIGS. 7 and 8 is like that of the embodiment of FIGS. 2 and 3. The spool 146 is urged upward at all times by the compression spring 164, and intermittently downward by a solenoid arrangement 78, 77, 84 (FIG. 1) which overpowers the spring. As the valve spool reciprocates, the rubber rings 99 and 101 alternately engage the seats 113 and 116 respectively with the poppet valve action, and there is no sliding friction between such rings and any other part of the valve assembly. The retainer sleeve 132 engages the upper end of the counterbore 115, absorbing part of the upward momentum of the spool 146 and minimizing the danger of rebound of the upper ring 99 away from its seat 113.

The modified valve device of FIGS. 7 and 8 is balanced and neither the solenoid nor the spring 164 is required to overcome any unbalanced hydraulic pressure at any time. The chief difference between the two embodiments is that in FIGS. 2 and 3 the spool areas below the lower valve seat 116 are exposed to atmospheric pressure (and therefore are balanced by atmospheric pressure on the upper end of the spool 94). whereas in FIGS. 7 and 8 the annular space 161 is sealed off from atmosphere except by way of the remote connection through exhaust port 159 and conduits 51 and 52. By sealing off the space 161 from atmosphere, and by balancing the surfaces adjacent said space, it is possible to adapt the valve assembly to additional uses.

For example, port 159 may be connected to the high pressure side of the gear pump 27, if desired, and the valve will be balanced as before, but the function of sealing off the high pressure fluid in the valve assembly will be transferred from the upper quad ring 133 to the lower quad ring 152 and seal rings 163. In that case, the conduits 40 and 41 would be transposed and the electric switch 89 modified to energize the solenoid coil 78 for engine driving and to de-energize the coil under conditions which call for engine braking. The modified valve arrangement of FIGS. 7 and 8 is adapted to greater varieties of hydraulic circuits than is the valve device of FIGS. 2 and 3. For example, the oblique port 128 near the middle of the modified valve device may be connected to the high pressure side of the pump 27 and in that event the valve device would deliver high pressure fluid alternately to the upper and lower ports 127 and 159. When the ports are so arranged, the valve device may be used for alternate filling of two tanks.

FIG. 10 shows, on a greatly enlarged scale, a modified shape of valve seat 165 which forms part of a shoulder 166 at the upper end of a counterbore 167 in valve body 168. The shoulder 166 corresponds in location and function to the shoulder 114 of FIG. 9 except that it is tapered to form a frusto-conical surface inclined downward and outward from the valve seat or edge 165 which engages the O-ring 99 on spool 169. The taper of the shoulder 166 in longitudinal section is along a line 170 which forms an angle of A with an imaginary line 171 extending from the inner edge 165 of the shoulder through the center of the circle of revolution of the toroidal ring 99. As shown in FIG. 10, the angle A is obtuse. As long as this angle is 90° or more, the valve device will be hydraulically balanced as in the case of FIGS. 2, 3 and 9 because the initial contact between the ring 99 and the shoulder 166 is along the sharp edge 165 which forms a thin circle of sealing contact having a radius equal to that of the bore 96. The latter has the same radius R1 as the circle of initial engagement in FIG. 9.

The modified valve body 168 of FIG. 10 may be provided with a shoulder (not shown) similar to shoulder 166 but at the lower end of counterbore 167 and inclined downwardly and inwardly to provide a seat for the lower O-ring 101. As shown in FIG. 10, the peripheral surface 172 of the portion of the spool 169 below the ring 99 is of lesser diameter than the corresponding surface 106 on the spool 94 of FIG. 3. The difference in diameters does not unbalance the valve device because the increase in exposed area on the bottom of ring 99 is offset by a corresponding increase in area at the top of ring 101. If desired, the valve body and seat of FIG. 10 could be combined with the spool 94 of FIG. 3.

FIG. 11 is a fragmentary view similar to FIG. 10 showing a further modification in which the principles of this invention are applied in an imperfect manner. The modified valve body 173 has a frusto-conical shoulder 174 which corresponds to the shoulder 166 but which tapers at a different angle to the horizontal plane. In longitudinal section the line of taper 175 forms an angle B with relation to the imaginary line 176. The latter corresponds to line 171 of the previous embodiment and runs from the center of the circle of revolution of the toroidal ring 99 through the sharp edge 177 at the intersection of the cylindrical surface 96 and frusto-conical surface 174. The angle B is acute or less than 90° and as a result the rubber ring 99 does not engage the corner 177 when it first comes into contact with the valve seat 174 but instead makes initial contact at a point of tangency 178 with the shoulder, such point forming part of a circle whose radius is greater than that of the bore 96. With the ring 99 in the FIG. 11 position, the upper part thereof is exposed to high pressure fluid between the circles 104 and 178, tending to move the spools downward and, as explained previously in connection with FIGS. 3 and 9, this pressure is opposed by a pressure of like intensity acting upward against the downwardly tapering shoulder 103 over an effective area corresponding to the space between the radii 104 and 96. The difference between the radii 178 and 96, therefore, determines the amount of unbalance of the device shown in FIG. 11. In some applications of the present invention, such an unbalance may be tolerated or possibly advantageous.

FIG. 12 is a fragmentary view similar to FIG. 10 but showing a further modification in which the principles of this invention are applied to provide a balanced valve device in which the toroidal rubber ring 99 is replaced by a rubber ring 179 having the shape of a triangle of revolution. The ring 179 is seated on top of a flat horizontal shoulder 181 on spool 182. Cooperating with the ring 179 is a valve seat 183 which forms part of a shoulder 184 at the upper end of a counterbore 185 in valve body 186. The shoulder 184 tapers at an angle C from the horizontal while the periphery of the rubber ring 179 tapers downwardly at an angle D. As illustrated in FIG. 12, the angle D is greater than the angle C and for this reason the point of initial contact between the rubber ring and valve seat is along the sharp edge 183 whose radius is equal to that of the bore 96 and the valve device is hydraulically balanced as previously described in connection with other embodiments. If the proportions of the parts were changed to make the angles C and D equal, the rubber ring 179 would make initial contact with the shoulder 184 over a wide annular area and the valve would be hydraulically unbalanced. If the angle C were greater than angle D, the initial contact would be made over a thin circular line, but the radius of the circle would be equal to the maximum outside radius of the ring 179 and, since this is greater than that of the bore 96, the valve device would be unbalanced.

Below the portion shown in FIG. 12, the spool 182 may be provided with a horizontal surface similar to shoulder 181 but facing downward to abut against the upper face of a triangular ring similar to ring 179 in inverted position. The valve body 186 likewise may be provided with a lower shoulder (not shown) comparable to shoulder 184 for engaging the lower rubber ring (not shown).

FIG. 13 shows schematically a solenoid valve assembly 187 forming part of a modified electric circuit for controlling the solenoid. The latter may be constructed like the assembly 15 of FIG. 1 but for the sake of simplicity is illustrated as a conventional arrangement of a coil 187 secured to the top of a sleeve valve body 189 which supports a spool 191 for reciprocation therein. The spool extends from a head 191 which forms a movable core within the coil 188 and which seats on a spring 193. The valve body 189 has an inlet port 127 which is connected by conduit 40 to the high pressure side of the pump 27 (FIG. 1); an outlet port 128 which is connected by conduit 41 to the control valve 24 (FIG. 1); and an exhaust port 124 leading to atmosphere or to the low pressure side of the pump. The spool 191 has a reduced portion 194 adapted to establish communication between conduits 40 and 41, and thereby condition the hydraulic system for engine braking, when the spool 191 is in its downward or energized position as shown in FIG. 13. Below the reduced portion 194, the spool 191 has an enlarged portion 195 which has a sliding fit with the bore 196 in the valve body 189. When the coil 188 is de-energized (by means to be described presently) the spring 193 slides the spool 191 upward until the enlarged portion 195 occupies a position intermediate the inlet and outlet ports 127 and 128 respectively, thereby cutting off the control valve 24 and conduit 41 from the high pressure side of the pump and connecting them instead to atmospheric pressure through the exhaust port 124. The solenoid coil 188 is energized by a circuit extending from ground 197 through coil 188, conductors 198 and 199, accelerator-controlled switch 201, conductor 202, clutch-controlled switch 203, conductor 204, manipulative switch 205 and conductor 206 to battery 207. The switches 201 and 203 are arranged to be broken when the driver of the vehicle presses his feet on the accelerator pedal 208 or clutch pedal 209 respectively. The manipulative switch 205 is of the three-way type and has a movable contact element 211 selectively adjustable to the position shown in FIG. 13, or to a second position in which it disconnects the live conductor 206 from the rest of the circuit, or to a third position in which it by-passes the foot operated switches 202 and 203 and connects the live conductor 206 through conductors 212 and 198 to the solenoid coil 188. When the three-way switch 205 is adjusted to the FIG. 13 position, the driver may convert the engine into a self-braking or retarding device by simply releasing the accelerator pedal 208. The switch 203 on the clutch pedal 209 de-energizes the solenoid, and therefore disables the engine brake, during the brief intervals that the clutch is being disengaged for shifting. This would prevent the driver from accidentally stalling the engine during shifting or as the vehicle rolls to a full stop.

While the invention has been described with particular reference to certain specific embodiments, it is susceptible of further modifications and variations. For example, the resilient rubber rings 99, 101 and 179 may be replaced by rigid rings of metal or plastic, in which case the valve seats would be machined, by means of a lapping operation, to fit the rings over the area of sealing contact. Moreover, the valve device is not limited to engine braking systems, or to solenoid actuation, or to the use of a liquid fluid but may be employed for controlling the flow of compressed air or gas.

The terms "upper" and "lower" used in the specification and claims are intended merely as a convenient expression for distinguishing one direction from another and do not imply that the valve assembly need be held in any particular position, inasmuch as the valve and solenoid actuator are not affected by gravity.

What is claimed is:

1. For use in a valve of the type having an elastic ring exposed to fluid pressure tending to dislodge the ring from its grooved support: a retainer sleeve having a bore and having an enlarged counterbored surface above the bore, the upper end of the counterbored surface including a cylindrical portion adapted to be slipped over the outside of the ring by relative upward movement of the sleeve, the counterbored surface having a second portion lying below the cylindrical portion, the second portion being curved and engageable with the bottom portion of the elastic ring.

2. A retainer sleeve according to claim 1, in which the counterbored surface includes a third portion below the curved portion, the third portion being in the shape of a cylinder having a diameter less than the first cylindrical portion but sufficiently large to permit the elastic ring to be forced into the third portion.

3. For use in a valve of the type having a pair of elastic rings exposed to fluid pressure tending to dislodge the rings from their grooved support, a retainer sleeve having a bore, a counterbore at each end of the sleeve, each counterbore being cylindrical at its outer end portion to facilitate entry of the associated ring into the counterbore and being curved at its inner portion to engage the associated ring and prevent relative axial movement between the sleeve and assembled rings.

4. In a valve, a spool assembly movable axially as a unit and comprising a spool, a pair of axially spaced arcuate grooves in the spool, a pair of elastic rings mounted in the respective grooves, and a retainer sleeve having a bore surrounding the spool and having a retainer portion surrounding at least part of one of the rings, said sleeve having a shoulder at each end of the bore to resist axial movement of the sleeve relative to the rings.

References Cited by the Examiner

UNITED STATES PATENTS

| | | | |
|---|---|---|---|
| 2,130,892 | 9/38 | Morphet | 192—.049 |
| 2,431,437 | 11/47 | Van Der Werff | 251—157 XR |
| 2,727,599 | 12/55 | Melfi | 192—.049 |
| 2,997,064 | 8/61 | Gerwig et al. | 137—620 |
| 3,016,917 | 1/62 | Hunt | 137—620 |

FOREIGN PATENTS 331,648  9/58  Switzerland.

M. CARY NELSON, *Primary Examiner.*

DON A. WAITE, *Examiner.*

UNITED STATES PATENT OFFICE
CERTIFICATE OF CORRECTION

Patent No. 3,202,182                                      August 24, 1965

Girard S. Haviland

It is hereby certified that error appears in the above numbered patent requiring correction and that the said Letters Patent should read as corrected below.

In the grant, lines 3 and 4, and in the heading to the printed specification, line 5, for "a corporation of Connecticut", each occurrence, read -- a corporation of New Jersey --; column 4, line 71, for "37" read -- 57 --; column 6, line 42, for "oil-resistent" read -- oil-resistant --; column 10, line 66, for "same" read -- sake --; line 67, for "speed" read -- spool --; column 11, line 57, after "given" insert -- only --; column 12, line 47, for "84" read -- 94 --; column 13, line 72, for "74" read -- 94 --; column 14, line 71, for "14" read -- 144 --; column 18, line 24, for "202 and 203" read -- 201 and 203 --.

Signed and sealed this 19th day of April 1966.

(SEAL)
Attest:

ERNEST W. SWIDER                                    EDWARD J. BRENNER
Attesting Officer                                        Commissioner of Patents